2 Sheets—Sheet 1.

S. D. KING,

Assignor, by mesne assignments, to J. B. SMITH and A. L. KING.

CAR TRUCK.

No. 10,216. Reissued Oct. 10, 1882.

Attest:
Walter Truelson
David Mead

Inventor
Sidney D. King
by Elis Spear
Atty.

N. PETERS, Photo-Lithographer, Washington, D. C.

S. D. KING,

Assignor, by mesne assignments, to J. B. SMITH and A. L. KING.

CAR TRUCK.

No. 10,216. Reissued Oct. 10, 1882.

Attest:
Walter Donaldson
David A. Mead

Inventor
Sidney D. King
by Elis Spear
Atty.

N. PETERS, Photo-Lithographer, Washington, D. C.

UNITED STATES PATENT OFFICE.

SIDNEY D. KING, OF PITTSTON, ASSIGNOR, BY MESNE ASSIGNMENTS, TO JOHN B. SMITH, OF DUNMORE, AND ANTOINETTE L. KING, OF WEST PITTSTON, PENNSYLVANIA.

CAR-TRUCK.

SPECIFICATION forming part of Reissued Letters Patent No. 10,216, dated October 10, 1882.

Original No. 221,577, dated November 11, 1879. Application for reissue filed July 24, 1882.

DIVISION B.

*To all whom it may concern:*

Be it known that I, SIDNEY D. KING, of Pittston, in the county of Luzerne and State of Pennsylvania, have invented a new and useful Improvement in Car-Trucks; and I do hereby declare that the following is a full, clear, and exact description of the same.

My invention relates to car-trucks; and it consists, first, in a car-truck having a single pair of wheels supporting the frame of the truck, with connections between the truck and the body of the car adapted to prevent the swiveling of the truck under the said car-body.

It consists, in the second place, of a non-swiveling car-truck having a single pair of wheels, with connections between the said truck and the car-body resting thereon adapted to permit lateral or rocking movement of said body upon the truck.

It consists, thirdly, of a non-swiveling car-truck having a single pair of wheels, with central bearings in front and rear of the axle for the support of the car-body upon the truck; and, fourth, it consists of a non-swiveling car-truck having a single pair of wheels and central rocking support of the body upon the said truck, in combination with means for limiting the rocking movement of the car-body upon the truck.

It consists, finally, in specific details of construction.

In the accompanying drawings I have shown my improved non-swiveling car-truck in connection with a dumping-car and a special form of brake; but these devices and combinations relating to the said dumping-car and brake form no part of the present application, but are claimed in another division of this application of even date herewith and marked "Division A."

Figure 1:
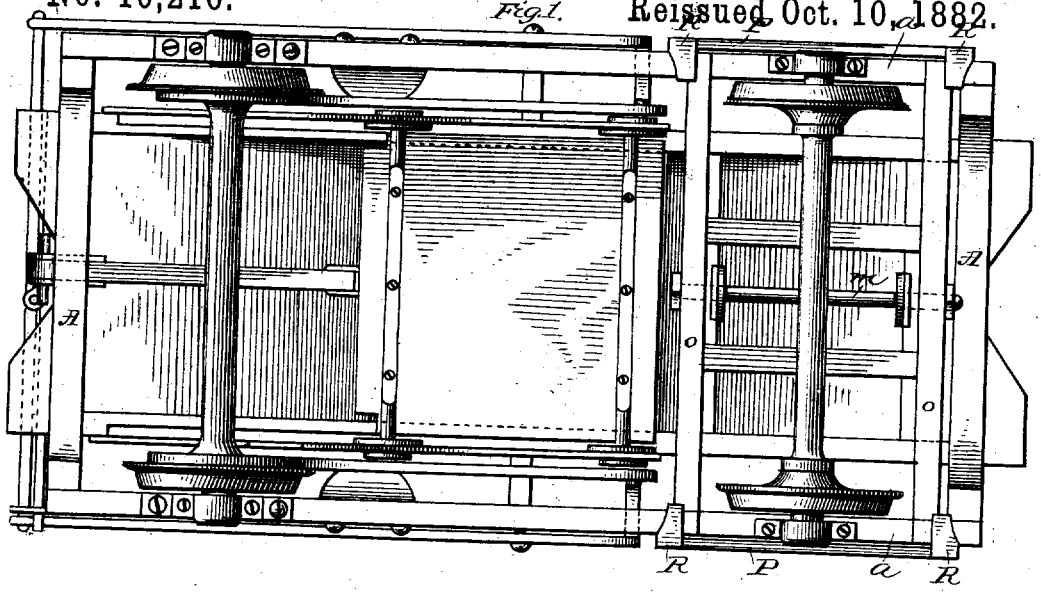
Figure 2:
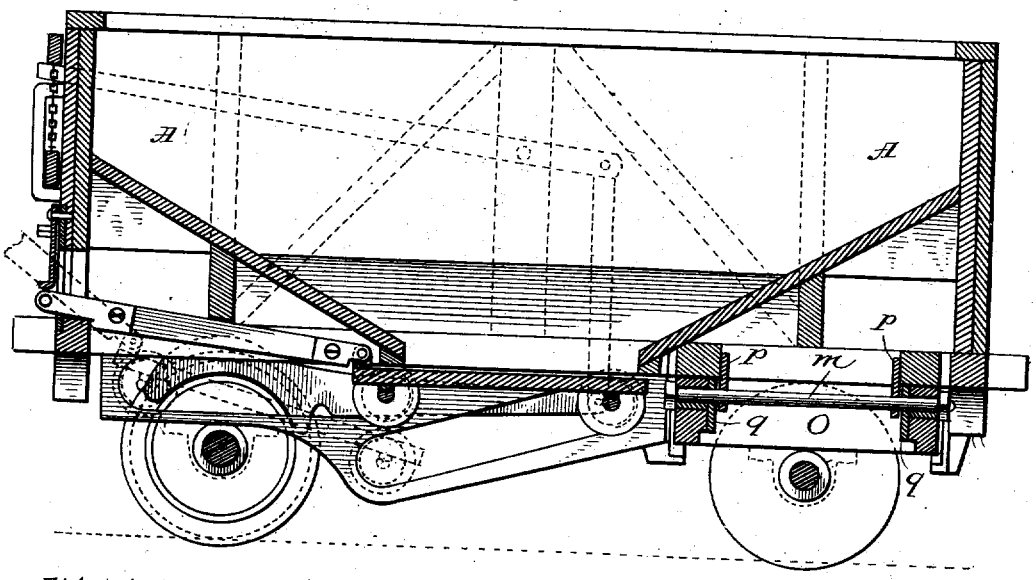
Figure 3:
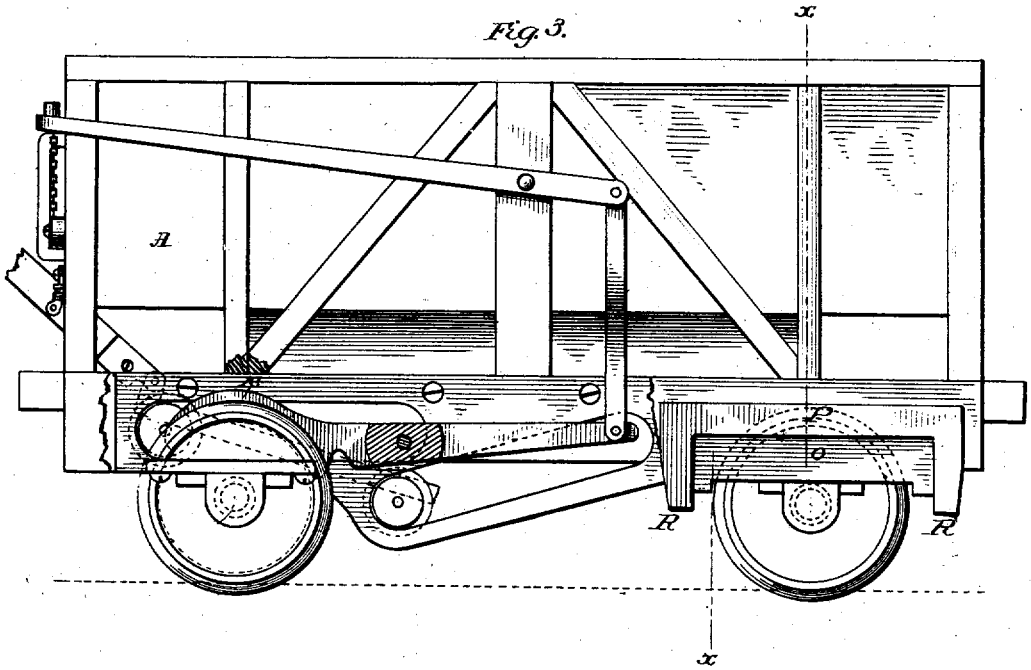
Figure 4:
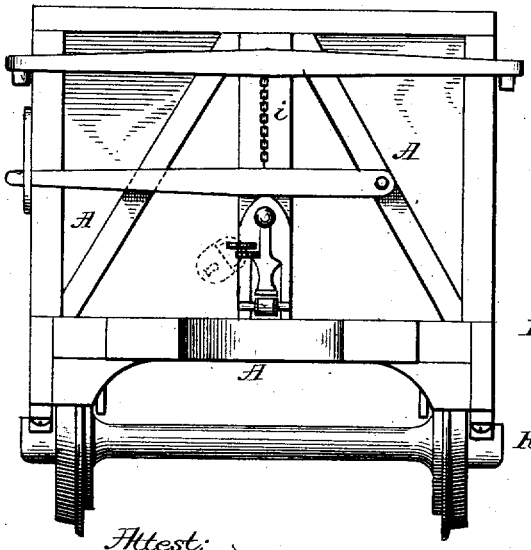
Figure 5:
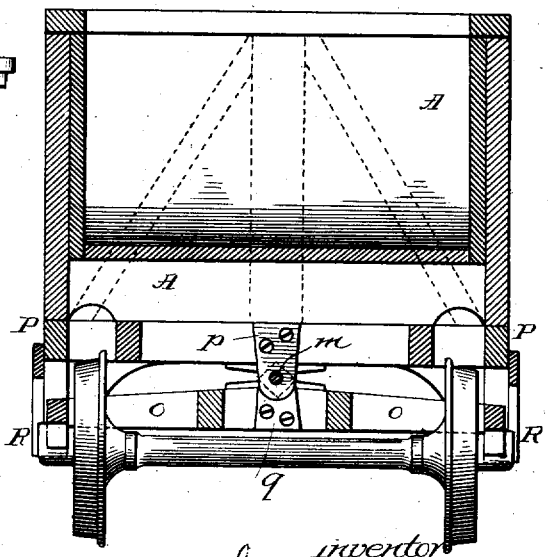

In these drawings, Figure 1 shows a bottom view of the car and truck. Fig. 2 is a central vertical section. Fig. 3 is a side elevation with outer parts broken away. Fig. 4 is an end view; and Fig. 5 is a transverse vertical section on the line *x x*, Fig. 3.

The frame of the truck is shown at O in various positions, being represented in all the views except Fig. 4. The main parts of it are the two transverse beams *o o* and the outside end pieces, *a a*, the bearings for the axle being in the said pieces or beams *a a*. In Fig. 1 are shown also interior longitudinal beams, giving additional strength to the frame. The car A is supported on this truck by means of a central shaft, *m*, running lengthwise of the car. This shaft forms a rocking connection between the body and the truck by means of perforated plates *p q*, the plates *p* being attached to the cross-beams of the car, as shown in Figs. 2 and 5, and projecting downward, with the holes in the lower end adapted to receive the shaft *m*. The plates *q* are fixed to the inner faces of the cross-beams of the truck and project upward, having holes registering with those in plates *p*. These devices hold the truck to the body and prevent the truck from swiveling thereunder, but permit rocking movement of the body upon the truck. On each side of the car, at the corners of the truck, is secured a casting, P, which has at each end a flanged projection, R. These extend down and embrace the corners of the truck, as shown more clearly in Fig. 2, thus limiting the rocking movement of the car-body upon the truck.

A car provided with the described form of truck in passing around curves where one side or line of rail is higher than the other and the track inclined will permit the truck to conform to such inclination, while the body of the car will remain comparatively level.

What I claim as new, and desire to secure by Letters Patent, is—

1. A truck-frame having a single pair of wheels supporting said frame, in combination with a car-body, and with non-swiveling and rocking connections between said body and truck-frame, substantially as described.

2. A truck-frame having a single pair of wheels supporting said frame, in combination with a car-body and central bearings in front and rear of the axle, whereby the truck is made non-swiveling and the body permitted to rock, substantially as described.

3. A truck-frame having a single pair of wheels supporting said frame, in combination with a car-body, with bearings to prevent swiveling of the truck and permit rocking motion of the body, and with devices for limiting the said rocking motion, substantially as described.

4. The combination of the truck-frame, the single pair of wheels, the car-body, the central non-swiveling rocking support, and the limiting devices P R, substantially as described.

5. The castings P, with flanged corner projections, R, formed with stops at their lower extremities, in combination with a car-body and a car-truck hung to the body on a longitudinal central shaft, substantially as and for the purposes set forth.

SIDNEY D. KING.

Witnesses:
G. S. FERRIS,
G. B. THOMPSON.